US009181806B2

(12) United States Patent
Propheter-Hinckley et al.

(10) Patent No.: US 9,181,806 B2
(45) Date of Patent: Nov. 10, 2015

(54) AIRFOIL WITH POWDER DAMPER

(75) Inventors: Tracy A. Propheter-Hinckley, Manchester, CT (US); Gregory M. Dolansky, Higganum, CT (US); Benjamin T. Fisk, East Granby, CT (US); Robert J. Treen, Wolcott, CT (US)

(73) Assignee: United Technologies Corporation, Hartford, CT (US)

( * ) Notice: Subject to any disclaimer, the term of this patent is extended or adjusted under 35 U.S.C. 154(b) by 949 days.

(21) Appl. No.: 13/454,440

(22) Filed: Apr. 24, 2012

(65) Prior Publication Data

US 2013/0280082 A1 Oct. 24, 2013

(51) Int. Cl.
| | | |
|---|---|---|
| *F01D 5/14* | (2006.01) | |
| *B21D 53/78* | (2006.01) | |
| *F01D 5/16* | (2006.01) | |
| *F01D 5/26* | (2006.01) | |
| *F01D 25/06* | (2006.01) | |

(52) U.S. Cl.
CPC .. *F01D 5/16* (2013.01); *F01D 5/26* (2013.01); *F01D 25/06* (2013.01); *Y10T 29/49316* (2015.01)

(58) Field of Classification Search
CPC .............. F01D 5/16; F01D 5/26; F01D 25/06
USPC ........... 416/144, 145, 248, 500, 232; 415/119
See application file for complete search history.

(56) References Cited

U.S. PATENT DOCUMENTS

| | | | |
|---|---|---|---|
| 2,343,918 A | 5/1943 | McCoy | |
| 2,771,240 A * | 11/1956 | Gurin | 416/145 |
| 2,862,686 A * | 12/1958 | Bartlett | 416/233 |
| 3,323,597 A * | 6/1967 | Lougobardi et al. | 416/144 |
| 3,586,460 A * | 6/1971 | Toner | 416/144 |
| 3,744,929 A * | 7/1973 | Huntington | 416/145 |
| 4,815,939 A | 3/1989 | Doble | |
| 5,129,284 A * | 7/1992 | Brueckner et al. | 416/144 |
| 5,165,860 A | 11/1992 | Stoner et al. | |
| 5,232,344 A * | 8/1993 | El-Aini | 416/145 |
| 5,558,497 A | 9/1996 | Kraft et al. | |
| 5,820,348 A * | 10/1998 | Fricke | 416/248 |
| 6,669,447 B2 | 12/2003 | Norris et al. | |
| 6,827,551 B1 * | 12/2004 | Duffy et al. | 415/119 |
| 7,029,232 B2 | 4/2006 | Tuffs et al. | |

(Continued)

FOREIGN PATENT DOCUMENTS

| | | |
|---|---|---|
| DE | 102010046579 | 3/2012 |
| WO | 9812449 | 3/1998 |

OTHER PUBLICATIONS

International Preliminary Report on Patentability for PCT Application No. PCT/US2013/037500, mailed Nov. 6, 2014.

(Continued)

*Primary Examiner* — Igor Kershteyn
(74) *Attorney, Agent, or Firm* — Carlson, Gaskey & Olds, P.C.

(57) ABSTRACT

An airfoil includes an airfoil body that defines a longitudinal axis. The airfoil body includes a leading edge and a trailing edge and a first sidewall and a second sidewall that is spaced apart from the first sidewall. The first sidewall and the second sidewall join the leading edge and the trailing edge and at least partially define at least one longitudinally elongated cavity in the airfoil body. A plurality of loose particles is enclosed in the at least one longitudinally elongated cavity.

25 Claims, 6 Drawing Sheets

(56) References Cited

U.S. PATENT DOCUMENTS

| | | | |
|---|---|---|---|
| 7,112,044 B2 | 9/2006 | Whitehead et al. | |
| 7,121,800 B2 | 10/2006 | Beattie | |
| 7,121,801 B2 | 10/2006 | Surace et al. | |
| 7,125,225 B2 | 10/2006 | Surace et al. | |
| 7,217,093 B2 | 5/2007 | Propheter et al. | |
| 7,270,517 B2 | 9/2007 | Garner | |
| 7,347,664 B2 * | 3/2008 | Kayser et al. | 415/200 |
| 7,478,994 B2 | 1/2009 | Cunha et al. | |
| 7,717,679 B2 * | 5/2010 | He | 416/144 |
| 2008/0273983 A1 | 11/2008 | Clark et al. | |
| 2008/0290215 A1 * | 11/2008 | Udall et al. | 244/123.14 |
| 2009/0074575 A1 | 3/2009 | Propheter-Hinckley et al. | |
| 2009/0258168 A1 | 10/2009 | Barcock | |
| 2009/0304497 A1 | 12/2009 | Meier et al. | |
| 2010/0143097 A1 | 6/2010 | Read et al. | |
| 2010/0221113 A1 | 9/2010 | Cairo | |
| 2011/0048664 A1 | 3/2011 | Kush et al. | |

OTHER PUBLICATIONS

International Search Report and Written Opinion for International Application No. PCT/US2013/037500 completed on Aug. 6, 2013.
European Search Report for European Application No. 13781995.9 completed Mar. 25, 2015.

* cited by examiner

AIRFOIL WITH POWDER DAMPER

BACKGROUND

This disclosure relates to an airfoil, such as an airfoil for a gas turbine engine.

Turbine, fan and compressor airfoil structures are typically manufactured using die casting techniques. For example, the airfoil is cast within a mold that defines an exterior airfoil surface. A core structure may be used within the mold to form impingement holes, cooling passages, ribs or other structures in the airfoil. The die casting technique inherently limits the geometry, size, wall thickness and location of these structures. Thus, the design of a traditional airfoil is limited to structures that can be manufactured using the die casting technique, which in turn may limit the performance of the airfoil.

SUMMARY

An airfoil according to an exemplary aspect of the present disclosure includes an airfoil body defining a longitudinal axis. The airfoil body includes a leading edge and a trailing edge and a first side wall and a second side wall that is spaced apart from the first side wall. The first side wall and the second side wall join the leading edge and the trailing edge and at least partially define at least one longitudinally elongated cavity in the airfoil body. A plurality of loose particles is enclosed in the at least one longitudinally elongated cavity.

In a further non-limiting embodiment of the above example, the at least one longitudinally elongated cavity is adjacent the leading edge.

In a further non-limiting embodiment of any of the foregoing examples, the at least one longitudinally elongated cavity is adjacent the trailing end.

In a further non-limiting embodiment of any of the foregoing examples, the airfoil body extends over a span from a base at a platform to a tip end, and the at least one longitudinally elongated cavity is contained within 50% of the span.

In a further non-limiting embodiment of any of the foregoing examples, the airfoil body extends over a span from a base at a platform to a tip end, with the base being at 0% of the span and the tip end being at 100% of the span, the at least one longitudinally elongated cavity is contained between 0% span and 50% span.

In a further non-limiting embodiment of any of the foregoing examples, the at least one longitudinally elongated cavity includes a plurality of longitudinally elongated cavities that are laterally spaced apart from each other with regard to the longitudinal axis.

In a further non-limiting embodiment of any of the foregoing examples, the airfoil body defines a chord dimension extending between the leading edge and the trailing edge, and the at least one longitudinally elongated cavity is contained within a middle 50% of the chord dimension.

In a further non-limiting embodiment of any of the foregoing examples, the at least one longitudinally elongated cavity is adjacent a cooling passage.

In a further non-limiting embodiment of any of the foregoing examples, the at least one longitudinally elongated cavity is located between cooling passages.

In a further non-limiting embodiment of any of the foregoing examples, the plurality of loose particles includes at least a bi-modal size distribution.

In a further non-limiting embodiment of any of the foregoing examples, the plurality of loose particles includes a uni-modal size distribution.

In a further non-limiting embodiment of any of the foregoing examples, the airfoil body, exclusive of the at least one longitudinally elongated cavity, is solid.

In a further non-limiting embodiment of any of the foregoing examples, the plurality of loose particles occupy from 99.9 volume percent to 80 volume percent of the at least one longitudinally elongated cavity.

A turbine engine according to an exemplary aspect of the present disclosure includes, optionally a fan, a compressor section, a combustor in fluid communication with the compressor section, and a turbine section in fluid communication with the combustor. The turbine section is coupled to drive the compressor section and the fan. At least one of the fan, the compressor section and the turbine section includes an airfoil having an airfoil body defining a longitudinal axis. The airfoil body includes a leading edge and a trailing edge and a first side wall and a second side wall that is spaced apart from the first side wall. The first side wall and the second side wall join the leading edge and the trailing edge and at least partially define at least one longitudinally elongated cavity in the airfoil body. A plurality of loose particles is enclosed in the at least one longitudinally elongated cavity.

In a further non-limiting embodiment of any of the foregoing examples, the airfoil body extends over a span from a base at a platform to a tip end, and the at least one longitudinally elongated cavity is contained with 50 percent of the span.

In a further non-limiting embodiment of any of the foregoing examples, the airfoil body extends over a span from a base at a platform to a tip end, with the base being at 0% of the span and the tip end being at 100% of the span, the at least one longitudinally elongated cavity is contained between 0% span and 50% span.

In a further non-limiting embodiment of any of the foregoing examples, the at least one longitudinally elongated cavity includes a plurality of longitudinally elongated cavities that are laterally spaced apart from each other with regard to the longitudinal axis.

In a further non-limiting embodiment of any of the foregoing examples, the airfoil body defines a chord dimension extending between the leading edge and the trailing edge, and the at least one longitudinally elongated cavity is contained within a middle 50% of the chord dimension.

In a further non-limiting embodiment of any of the foregoing examples, the plurality of loose particles includes at least a bi-modal size distribution.

In a further non-limiting embodiment of any of the foregoing examples, the airfoil body, exclusive of the at least one longitudinally elongated cavity, is solid.

A method for processing an airfoil according to an exemplary aspect of the present disclosure includes depositing multiple layers of a powdered metal onto one another, joining the layers to one another with reference to data relating to a particular cross-section of an airfoil, and producing the airfoil with an airfoil body defining a longitudinal axis. The airfoil body includes a leading edge and a trailing edge and a first side wall and a second side wall that is spaced apart from the first side wall. The first side wall and the second side wall join the leading edge and the trailing edge and at least partially define at least one longitudinally elongated cavity in the airfoil body. A plurality of loose particles is enclosed in the at least one longitudinally elongated cavity.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION OF THE PREFERRED EMBODIMENT

Figure 1:
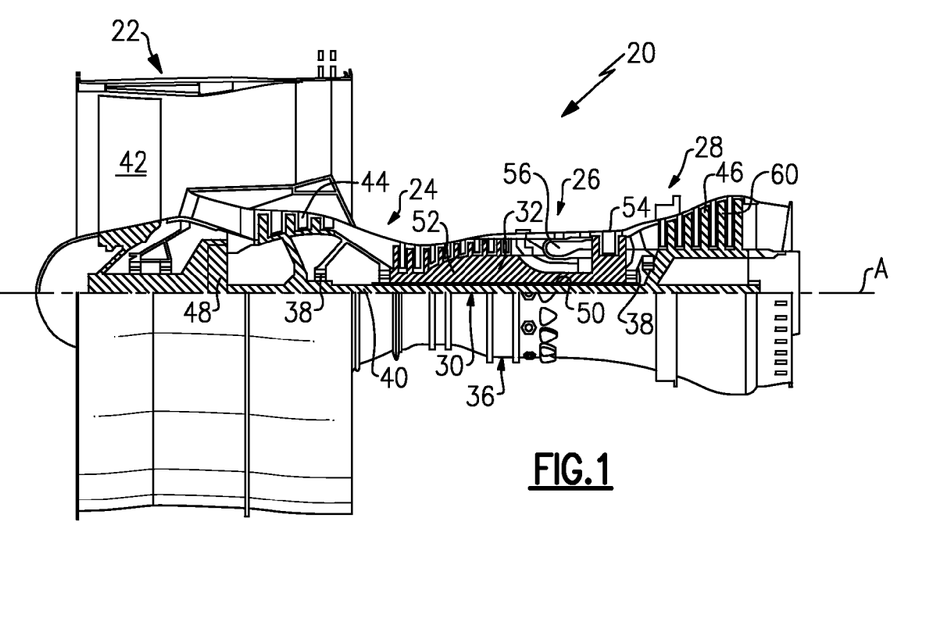
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 may be connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

Figure 2:
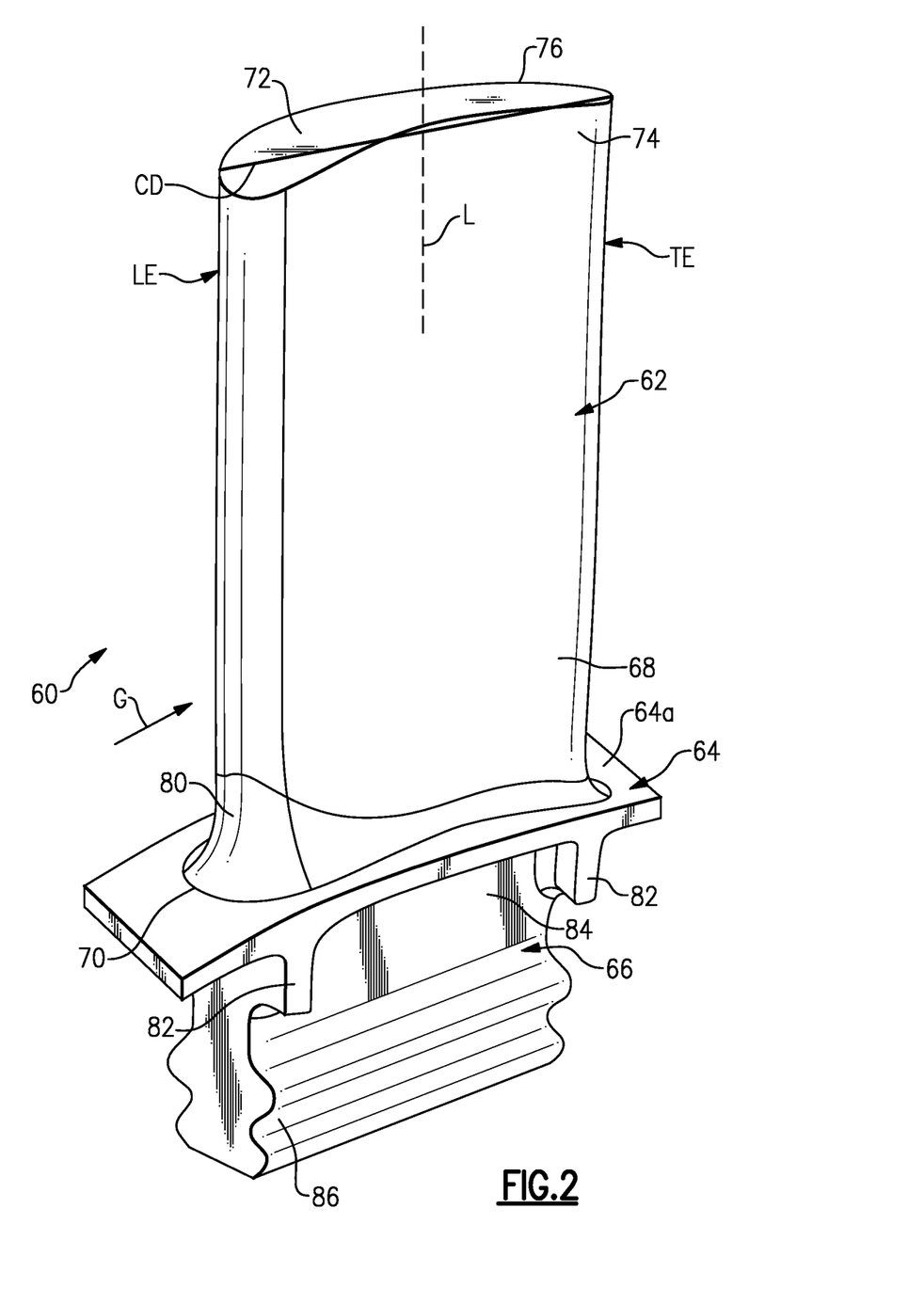
FIG. 2 shows a perspective view of an airfoil.

FIG. 2 illustrates an example airfoil 60. In this example, the airfoil 60 is a turbine blade of the turbine section 28. The airfoil 60 may be mounted on a turbine disk in a known manner with a plurality of like airfoils. Alternatively, it is to be understood that although the airfoil 60 is depicted as a turbine blade, the disclosure is not limited to turbine blades and the concepts disclosed herein are applicable to turbine vanes, compressor airfoils (blades or vanes) in the compressor section 24, fan airfoils in the fan section 22 or any other airfoil structures. Thus, some features that are particular to the illustrated turbine blade are to be considered optional.

The airfoil 60 includes an airfoil portion 62, a platform 64 and a root 66. The platform 64 and the root 66 are particular to the turbine blade and thus may differ in other airfoil structures or be excluded in other airfoil structures.

The airfoil 60 includes a body 68 that defines a longitudinal axis L between a base 70 at the platform 64 and a tip end 72. The longitudinal axis L in this example is perpendicular to the engine central axis A. The body 68 includes a leading edge (LE) and a trailing edge (TE) and a first side wall 74 (pressure side) and a second side wall 76 (suction side) that is spaced apart from the first side wall 74. The first side wall 74 and the second side wall 76 join the leading edge (LE) and the trailing edge (TE) and at least partially define a longitudinally elongated cavity 78 (FIG. 3) in the body 68.

The airfoil portion 62 connects to the platform 64 at a fillet 80. The platform 64 connects to the root 66 at buttresses 82. The root 66 generally includes a neck 84 and a serration portion 85 for securing the airfoil 60 in a disk.

It should be understood that relative positional terms such as "forward," "aft," "upper," "lower," "above," "below," "circumferential," "radial" and the like are with reference to the normal operational attitude and engine central axis A, unless otherwise indicated. Furthermore, with reference to the engine 20, the tip end 72 of the airfoil 60 is commonly referred to as the outer diameter of the airfoil 60 and the root 66 is commonly referred to as the inner diameter of the airfoil 60. The platform 64 includes an upper surface 64a that bounds an inner diameter of a gas path, generally shown as G, over the airfoil portion 62. Some airfoils may also include a platform at the tip end 72 that bounds an outer diameter of the gas path G.

Figure 3:
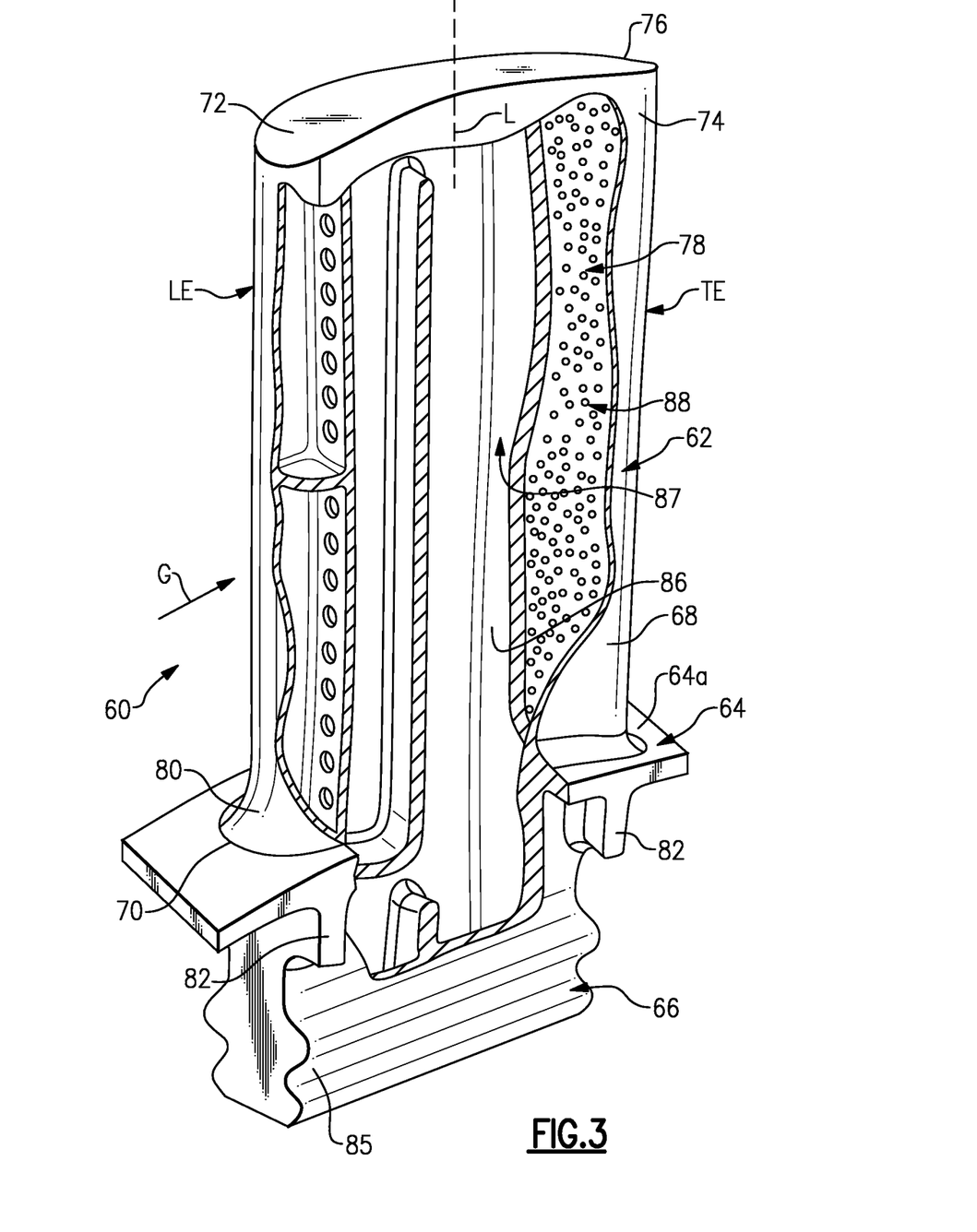
FIG. 3 shows the airfoil of FIG. 2 with a portion of a sidewall cutaway to reveal an interior cavity.

FIG. 3 illustrates the airfoil 60 of FIG. 2 with a portion of the first sidewall 74 cutaway to reveal the interior of the airfoil portion 62. In this example, the longitudinally elongated cavity 78 is adjacent the trailing edge (TE) of the airfoil body 68. That is, the longitudinally elongated cavity 78 is at least closer to the trailing edge (TE) than to the leading edge (LE).

In this example, the longitudinally elongated cavity 78 is bounded laterally by the first side wall 74, the second side wall 76 and a forward wall 86 that extends between the first side wall 74 and the second side wall 76. The forward wall 86 also bounds an aft side of a serpentine cooling passage 87.

A plurality of loose particles 88 are enclosed within the longitudinally elongated cavity 78. In one example, the plurality of loose particles 88 have a composition equivalent to the airfoil body 68. In another example, at least a portion of the plurality of loose particles 88 have a composition non-equivalent to the airfoil body 68.

As shown, the plurality of loose particles 88 are distributed through the longitudinally elongated cavity 78. However, in different states of operation, the plurality of loose particles 88 may be shifted towards a side or end of the longitudinally elongated cavity 78, depending upon the operational state of the airfoil 60. The plurality of loose particles occupy from 99.9 volume percent to 80 volume percent of the total volume of the longitudinally elongated cavity 78.

In operation, the plurality of loose particles 88 serve as a vibrational damper within the airfoil 60. For example, upon rotation of the airfoil 60 within the engine 20, the plurality of loose particles 88 contact each other and/or the walls 74, 76 and 86. Particle friction removes energy from the system and thus reduces vibration. As can be appreciated, the location and size of the longitudinally elongated cavity 78 and the size and amount of the plurality of loose particles 88 can be tailored in a design stage to provide a specific degree of dampening or dampening at a specific location in the airfoil 60.

Figure 4:
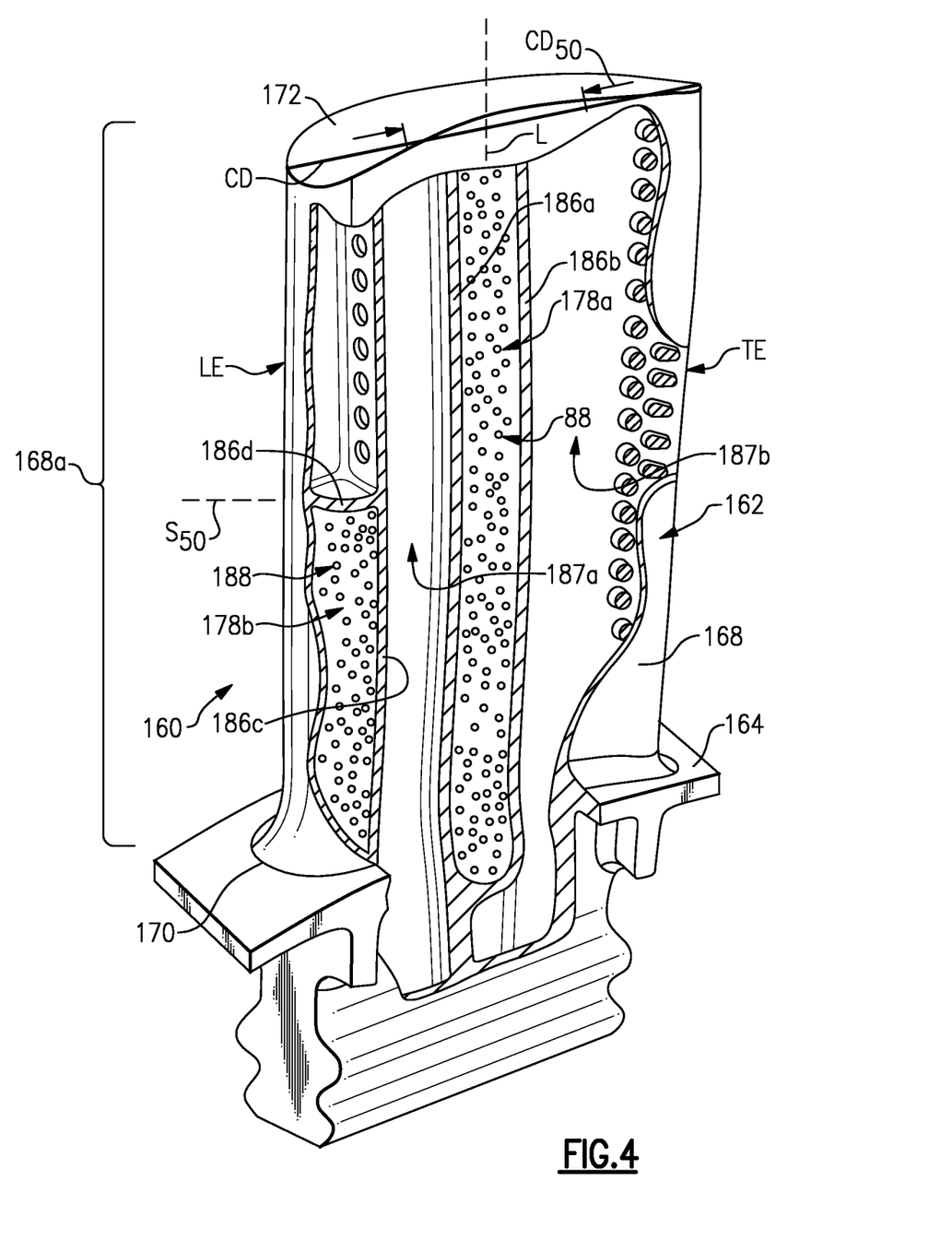
FIG. 4 shows another example airfoil with a portion of a sidewall cutaway to reveal an interior cavity.

FIG. 4 illustrates a modified airfoil 160. In this disclosure, like reference numerals designate like elements where appropriate and reference numerals with the addition of one-hundred or multiples thereof designate modified elements that are understood to incorporate the same features and benefits of the corresponding elements. In this example, the airfoil 160 includes a plurality of longitudinally elongated cavities, which include a first longitudinally elongated cavity 178a and a second longitudinally elongated cavity 178b. It is to be understood that although two longitudinally elongated cavities are shown, that additional longitudinally elongated cavities could be used. Furthermore, although the longitudinally elongated cavities 178a and 178b are shown together in the airfoil 160, it is to be understood that either longitudinally elongated cavity 178a or 178b could be used without the other.

In this example, the first longitudinally elongated cavity 178a is bounded laterally by the first side wall 74 and the second side wall 76, and a forward wall 186a and an aft wall 186b that extend between the first side wall 74 and the second side wall 76. The forward wall 186a also bounds an aft side of a cooling passage 187a, while the aft wall 186b bounds cooling passage 187b.

The second longitudinally elongated cavity 178b is bounded laterally by the first side wall 74, the second side wall 76 and an aft wall 186c that extends between the first side wall 74 and the second side wall 76. The aft wall 186c also bounds a forward side of the cooling passage 187a. In this example, the first longitudinally elongated cavity 178a extends a full longitudinal length of the airfoil portion 162 between the platform 164 and the tip end 172. A top wall 186d extends between the first side wall 74, the second side wall 76 and the aft wall 186c such that the second longitudinally elongated cavity 178b is longitudinally shorter than the first longitudinally elongated cavity 178a.

The airfoil body 168 extends between the leading edge (LE) and the trailing edge (TE). The leading edge (LE) and the trailing edge (TE) define a chord dimension (CD) therebetween. Additionally, the airfoil body 168 extends along a span 168a from the base 170 to the tip end 172, with the base 170 being at a 0% span and the tip end 172 being at a 100% span.

In this example, the first longitudinally elongated cavity 178a is located in a middle 50% of the chord dimension (CD), as represented at dimension $CD_{50}$. The second longitudinally elongated cavity 178b is adjacent the leading edge (LE) and extends from 0% span to 50% span, as represented at $S_{50}$. The second longitudinally elongated cavity 178b is thus contained within 50% of the span 168a. Although the second longitudinally elongated cavity 178b extends from 0% to 50% span in this example, in other examples the second longitudinally elongated cavity 178b can be contained within 50% of the span 168a and span from 25% to 75% span or from 50% to 100% span, for example.

Figure 5:
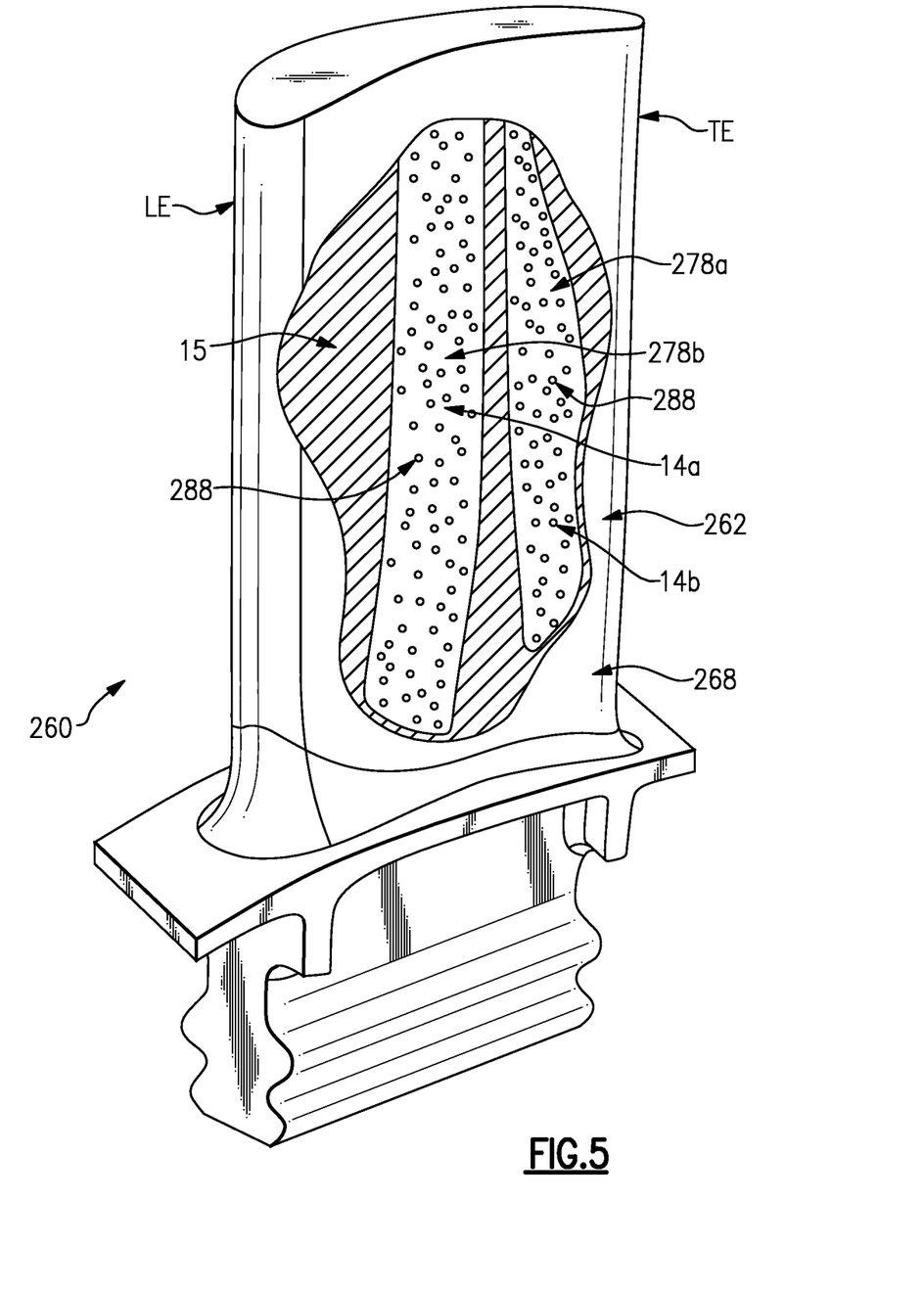
FIG. 5 illustrates another example airfoil with a portion of a sidewall cutaway to reveal an interior cavity.

FIG. 5 illustrates another modified airfoil 260. In this example, the airfoil 260 includes a first longitudinally elongated cavity 278a and a second longitudinally elongated cavity 278b each having a plurality of loose particles 288 enclosed therein. Unlike the airfoil 160 shown in FIG. 4, the airfoil body 268 of the airfoil 260 is solid, with the exception of the longitudinally elongated cavities 278a and 278b that include the plurality of loose particles 288. Thus, the airfoils 60 and 160 are cooled airfoils and the airfoil 260 is an uncooled airfoil.

Figure 6A:
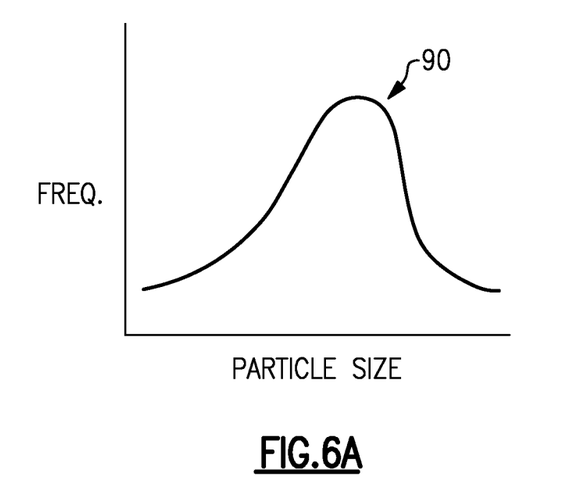
FIG. 6A illustrates a uni-modal particle distribution.
Figure 6B:
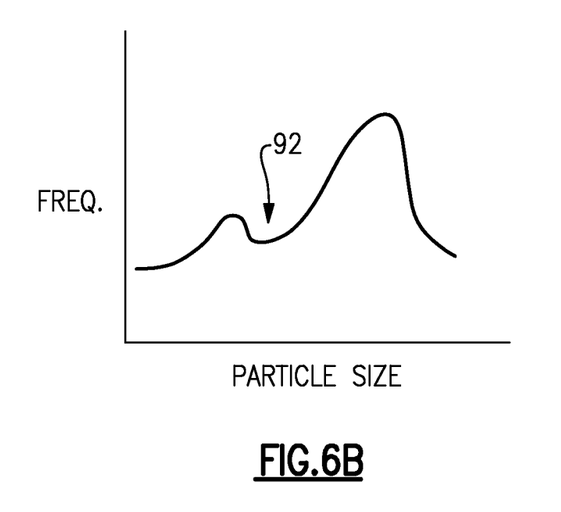
FIG. 6B illustrates a bi-modal particle distribution.

FIGS. 6A and 6B illustrate respective graphs showing different particle size distributions of the plurality of loose particles 88/188/288. For example, the plurality of loose particles 88/188/288 can have a uni-modal distribution 90 as shown in FIG. 6A. Alternatively, the plurality of loose particles 88/188/288 can have at least a bi-modal distribution 92 as shown in FIG. 6B. For example, the bi-modal distribution provides variation in mass distribution and thus can be used to tailor the dampening properties of the plurality of loose particles 88/188/288.

Figure 7:
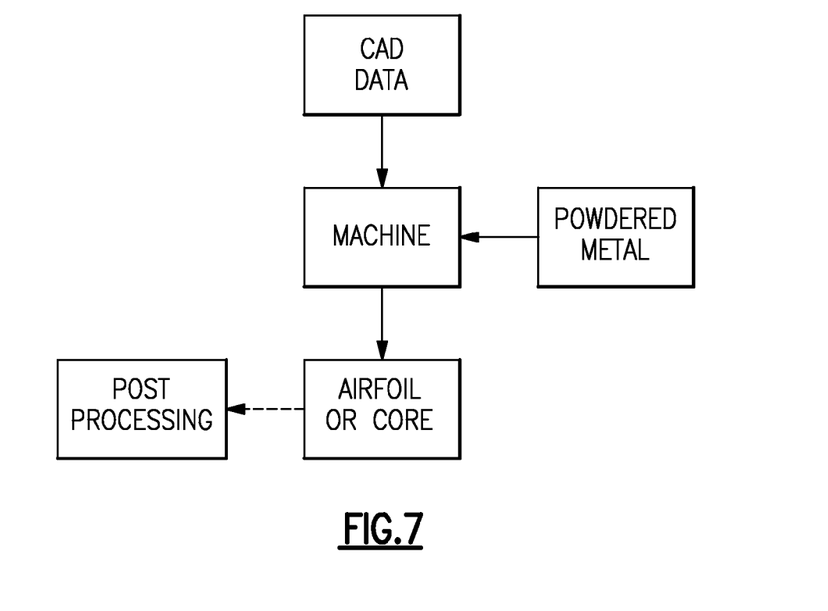
FIG. 7 illustrates a method for processing an airfoil.

The geometries of the airfoils 60/160/260 disclosed herein may be difficult to form using conventional casting technologies. Thus, a method of processing the airfoil 60/160/260 includes an additive manufacturing process, as schematically illustrated in FIG. 7. Powdered metal suitable for aerospace airfoil applications is fed to a machine, which may provide a vacuum, for example. The machine deposits multiple layers of powdered metal onto one another. The layers are selectively joined to one another with reference to Computer-Aided Design data to form solid structures that relate to a particular cross-section of the airfoil 60/160/260. In one example, the powdered metal is selectively melted using a direct metal laser sintering process or an electron-beam melting process.

Other layers or portions of layers corresponding to negative features, such as cavities or openings, are not joined and thus remain as a powdered metal. The unjoined powder metal may later be removed using blown air, for example. However, in the airfoils 60/160/260, powdered metal is left in the respective longitudinally elongated cavities 78/178a/178b/278a/278b during the manufacturing to form the plurality of loose particles 88/188/288. The walls of the respective longitudinally elongated cavities 78/178a/178b/278a/278b are thus built around the plurality of loose particles 88/188/288 and there is therefore no need to build an airfoil with an entrance that later has to be plugged. The plurality of loose particles 88/188/288 may be partially joined or sintered to form larger particle sizes or multi-modal size distributions.

With the layers built upon one another and joined to one another cross-section by cross-section, an airfoil or portion thereof, such as for a repair, with any or all of the above-described geometries, may be produced. The airfoil may be post-processed to provide desired structural characteristics. For example, the airfoil may be heated to reconfigure the joined layers into a single crystalline structure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
an airfoil body defining a longitudinal axis, the airfoil body including a leading edge and a trailing edge and a first side wall and a second side wall that is spaced apart from the first side wall, the first side wall and the second side wall joining the leading edge and the trailing edge and at least partially defining at least one longitudinally elongated cavity in the airfoil body, at least one longitudinally elongated cavity is adjacent a cooling passage; and a plurality of loose particles enclosed in the at least one longitudinally elongated cavity.

2. The airfoil as recited in claim 1, wherein the at least one longitudinally elongated cavity is adjacent the leading edge.

3. The airfoil as recited in claim 1, wherein the at least one longitudinally elongated cavity is adjacent the trailing end.

4. The airfoil as recited in claim 1, wherein the airfoil body extends over a span from a base at a platform to a tip end, and the at least one longitudinally elongated cavity is contained within 50% of the span.

5. An airfoil comprising:
an airfoil body defining a longitudinal axis, the airfoil body including a leading edge and a trailing edge and a first side wall and a second side wall that is spaced apart from the first side wall, the first side wall and the second side wall joining the leading edge and the trailing edge and at least partially defining at least one longitudinally elongated cavity in the airfoil body, at least one longitudinally elongated cavity is adjacent a cooling passage; and
a plurality of loose particles enclosed in the at least one longitudinally elongated cavity, wherein the airfoil body extends over a span from a base at a platform to a tip end, with the base being at 0% of the span and the tip being at 100% of the span, and the at least one longitudinally elongated cavity is contained within 50% of the span.

6. The airfoil as recited in claim 1, wherein the at least one longitudinally elongated cavity includes a plurality of longitudinally elongated cavities that are laterally spaced apart from each other with regard to the longitudinal axis.

7. The airfoil as recited in claim 5, wherein the the at least one longitudinally elongated cavity is contained within a middle 50% of the chord dimension.

8. The airfoil as recited in claim 1, wherein the at least one longitudinally elongated cavity is located between cooling passages.

9. The airfoil as recited in claim 1, wherein the plurality of loose particles include at least a bi-modal size distribution.

10. The airfoil as recited in claim 1, wherein the plurality of loose particles include a uni-modal size distribution.

11. The airfoil as recited in claim 1, wherein the airfoil body, exclusive of the at least one longitudinally elongated cavity, is solid.

12. The airfoil as recited in claim 1, wherein the plurality of loose particles occupy from 99.9 volume percent to 80 volume percent of the at least one longitudinally elongated cavity.

13. The airfoil as recited in claim 1, wherein the plurality of loose particles serve as a vibrational damper in the airfoil body and are formed of a powdered metal left in the at least one longitudinally elongated cavity from fabrication of the airfoil body.

14. A turbine engine comprising:
optionally, a fan;
a compressor section;
a combustor in fluid communication with the compressor section; and
a turbine section in fluid communication with the combustor, the turbine section being coupled to drive the compressor section and the fan, and
at least one of the fan, the compressor section and the turbine section including an airfoil having an airfoil body defining a longitudinal axis, the airfoil body including a leading edge and a trailing edge and a first side wall and a second side wall that is spaced apart from the first side wall, the first side wall and the second side wall joining the leading edge and the trailing edge and at least partially defining at least one longitudinally elongated cavity in the airfoil body, at least one longitudinally elongated cavity is adjacent a cooling passage, and
a plurality of loose particles are enclosed in the at least one longitudinally elongated cavity.

15. The turbine engine as recited in claim 14, wherein the airfoil body extends over a span from a base at a platform to a tip end, and the at least one longitudinally elongated cavity is contained with 50 percent of the span.

16. The turbine engine as recited in claim 14, wherein the airfoil body extends over a span from a base at a platform to a tip end, with the base being at 0% of the span and the tip end being at 100% of the span, the at least one longitudinally elongated cavity is contained between 0% span and 50% span.

17. The turbine engine as recited in claim 14, wherein the at least one longitudinally elongated cavity includes a plurality of longitudinally elongated cavities that are laterally spaced apart from each other with regard to the longitudinal axis.

18. The turbine engine as recited in claim 14, wherein the airfoil body defines a chord dimension extending between the leading edge and the trailing edge, and the at least one longitudinally elongated cavity is contained within a middle 50% of the chord dimension.

19. The turbine engine as recited in claim 14, wherein the plurality of loose particles include at least a bi-modal size distribution.

20. The turbine engine as recited in claim 14, wherein the airfoil body, exclusive of the at least one longitudinally elongated cavity, is solid.

21. A method for processing an airfoil, the method comprising:
depositing multiple layers of a powdered metal onto one another;
joining the layers to one another with reference to data relating to a particular cross-section of an airfoil; and
producing the airfoil with an airfoil body defining a longitudinal axis, the airfoil body including a leading edge and a trailing edge and a first side wall and a second side wall that is spaced apart from the first side wall, the first side wall and the second side wall joining the leading edge and the trailing edge and at least partially defining at least one longitudinally elongated cavity in the airfoil body, at least one longitudinally elongated cavity is adjacent a cooling passage and a plurality of loose particles enclosed in the at least one longitudinally elongated cavity.

22. The airfoil as recited in claim 5, wherein the at least one longitudinally elongated cavity is contained between 0% span and 50% span.

23. The airfoil as recited in claim 5, wherein the at least one longitudinally elongated cavity includes a plurality of longitudinally elongated cavities that are laterally spaced apart from each other with regard to the longitudinal axis.

24. The airfoil as recited in claim 5, wherein the loose particles are made of the same material as the airfoil body.

25. The airfoil as recited in claim 5, wherein the plurality of loose particles serve as a vibrational damper in the airfoil body and are formed of a powdered metal left in the at least one longitudinally elongated cavity from fabrication of the airfoil body.

\* \* \* \* \*